US007666520B2

(12) United States Patent
Wieres et al.

(10) Patent No.: US 7,666,520 B2
(45) Date of Patent: Feb. 23, 2010

(54) HONEYCOMB BODY WITH AN END-SIDE BRAZING ZONE, EXHAUST-GAS TREATMENT COMPONENT AND MOTOR VEHICLE HAVING A HONEYCOMB BODY AND METHOD FOR PRODUCING A HONEYCOMB BODY

(75) Inventors: Ludwig Wieres, Overath (DE); Jörg Gutowski, Eisenach (DE); Michael Voit, Leverkusen (DE); Ferdi Kurth, Mechernich (DE)

(73) Assignee: EMITEC Gesellschaft fuer Emissionstegchnologie mbH, Lohmar (DE)

( * ) Notice: Subject to any disclaimer, the term of this patent is extended or adjusted under 35 U.S.C. 154(b) by 0 days.

(21) Appl. No.: 12/053,684

(22) Filed: Mar. 24, 2008

(65) Prior Publication Data

US 2008/0213614 A1  Sep. 4, 2008

Related U.S. Application Data

(63) Continuation of application No. PCT/EP2006/009198, filed on Sep. 22, 2006.

(30) Foreign Application Priority Data

Sep. 23, 2005  (DE)  ........................ 10 2005 045 492

(51) Int. Cl.
*B32B 3/12* (2006.01)
*B01J 35/04* (2006.01)
*F01N 3/28* (2006.01)

(52) U.S. Cl. ........................ 428/593; 228/181; 228/245; 29/890; 502/439; 502/527.22; 422/179; 422/180; 428/591; 428/594

(58) Field of Classification Search .................. None
See application file for complete search history.

(56) References Cited

U.S. PATENT DOCUMENTS

| 5,084,361 | A |   | 1/1992 | Toyoda et al. |
| 5,304,351 | A |   | 4/1994 | Tanaka et al. |
| 5,403,558 | A | * | 4/1995 | Kono et al. .................. 422/179 |
| 5,486,338 | A | * | 1/1996 | Ota et al. .................... 422/179 |

(Continued)

FOREIGN PATENT DOCUMENTS

DE  42 41 469 A1  6/1994

(Continued)

OTHER PUBLICATIONS

International Search Report, dated Nov. 8, 2006.

*Primary Examiner*—John J Zimmerman
(74) *Attorney, Agent, or Firm*—Laurence A. Greenberg; Werner H. Stemer; Ralph E. Locher

(57) ABSTRACT

A honeycomb body includes two opposite end sides, at least one housing and at least one metallic layer forming channels. At least one of the end sides has at least one brazed zone forming a belt-shaped, brazing material-free zone adjacent the housing. A method for producing the honeycomb body, an exhaust-gas treatment component for an internal combustion engine and a motor vehicle having the honeycomb body, are also provided.

10 Claims, 1 Drawing Sheet

U.S. PATENT DOCUMENTS

| | | |
|---|---|---|
| 5,618,501 A | 4/1997 | Wieres et al. |
| 5,851,496 A | 12/1998 | Sakurai |
| 6,368,726 B1 * | 4/2002 | Holpp et al. ................. 428/593 |
| 6,371,360 B1 * | 4/2002 | Maus et al. ................. 228/181 |
| 6,425,517 B1 * | 7/2002 | Wieres et al. ............ 228/248.1 |
| 6,660,401 B2 * | 12/2003 | Hsu ........................... 428/593 |
| 2003/0049484 A1 * | 3/2003 | Bruck et al. ................. 428/593 |

FOREIGN PATENT DOCUMENTS

| | | |
|---|---|---|
| EP | 0 486 276 A1 | 5/1992 |
| EP | 0786585 A2 | 7/1997 |
| EP | 1224974 A1 | 7/2002 |
| JP | 2-261550 A | 10/1990 |
| JP | 10076165 A | 3/1998 |

* cited by examiner

HONEYCOMB BODY WITH AN END-SIDE BRAZING ZONE, EXHAUST-GAS TREATMENT COMPONENT AND MOTOR VEHICLE HAVING A HONEYCOMB BODY AND METHOD FOR PRODUCING A HONEYCOMB BODY

CROSS-REFERENCE TO RELATED APPLICATIONS

This is a continuation, under 35 U.S.C. §120, of copending International Application No. PCT/EP2006/009198, filed Sep. 22, 2006, which designated the United States; this application also claims the priority, under 35 U.S.C. §119, of German Patent Application DE 10 2005 045 492.5, filed Sep. 23, 2005; the prior applications are herewith incorporated by reference in their entirety.

BACKGROUND OF THE INVENTION

Field of the Invention

The present invention relates to a honeycomb body with two opposite end sides, at least one housing and at least one metallic layer which forms channels. The honeycomb body is brazed at least at one end side within one zone. A preferred field of use for such honeycomb bodies is the exhaust-gas treatment of mobile internal combustion engines. The invention also relates to an exhaust-gas treatment component and a vehicle having a honeycomb body as well as a method for producing a honeycomb body.

In such honeycomb bodies, the housing is conventionally formed with a thick-walled casing tube, and the metallic layer conventionally includes at least one at least partially structured metal foil. With regard to the field of use of the honeycomb body, the components are subjected to high fluctuating thermal and dynamic loads. It is therefore important to ensure a permanent connection of the metallic layer to the housing and of the layers to one another. In that case, it is known to braze not the entire honeycomb body but only partial regions thereof to the housing, so that the non-brazed partial regions can, to an extent, compensate different thermal expansion properties. The spatially distributed brazed partial regions are also referred to together as a brazed pattern.

However, particularly in the case of relatively large honeycomb bodies which are formed with large diameters but a small axial length, connection failures occasionally occurred after production in the edge region between the metallic layers and the housing. In particular, it was possible in part to observe detachment of the metallic layers from the housing, so that a type of gap was present at that point. In the event of long-term loading of the honeycomb body, however, the gap resulted in component failure under some circumstances.

BRIEF SUMMARY OF THE INVENTION

It is accordingly an object of the invention to provide a honeycomb body with an end-side brazing zone, an exhaust-gas treatment component and a motor vehicle having a honeycomb body and a method for producing a honeycomb body, which at least partially overcome the hereinafore-mentioned disadvantages and technical problems of the heretofore-known devices and methods of this general type and which ensure a good connection of a metallic layer or layers to a housing even in the case of an unfavorable diameter/length ratio. At the same time, the honeycomb body should provide good compensation of different thermal expansion properties of the components of the honeycomb body, and a high level of strength or flexibility with regard to the fluctuating thermal and dynamic loading.

With the foregoing and other objects in view there is provided, in accordance with the invention, a honeycomb body, comprising two oppositely-disposed end sides, at least one housing, at least one metallic layer forming channels, and at least one brazed zone disposed at least at one of the end sides and forming a belt-shaped brazing material-free region adjoining the housing.

The term "end sides" refers, in particular, to those sides of the honeycomb body from which channels extend into inner regions of the honeycomb body. Depending on the construction of the honeycomb body, the end side or face can be substantially planar or else can be formed at least partially with elevations and/or depressions. In addition, it is also possible for the end side to have a round, oval, approximately angular or some other shape. The two end sides preferably have identical construction with regard to shape and the provision of a brazed zone.

For explanation, it is pointed out at this juncture that "hard-soldering" or "brazing" always means a connecting technique with brazing material at temperatures above 450° C. It is fundamentally possible for a number of brazed zones to be provided at one end side, wherein in this case, however, one forms the outer, brazing material-free region. For example, a number of concentric zones can be provided, or an outer delimitation of the zone determines the brazing material-free region, while one or more further zones are connected to the inner delimitation of that zone.

The explicit shape of the brazed zone and of the brazing material-free region is preferably oriented to the construction of the honeycomb body or of the housing itself. If the honeycomb body is, for example, formed with a round cross section, then it is preferably also the case that the one zone is round and the brazing material-free region is therefore annular. An adaptation of the zone to a non-cylindrical construction of the honeycomb body takes place in a corresponding way, with the belt-shaped brazing material-free region being formed with a substantially constant width where possible. In this case, the belt-shaped brazing material-free region runs directly on the housing around its inner periphery. In this case, the region includes at least one section of the metallic layer or a plurality of channels formed thereby. The problems described in the introduction do not occur with an embodiment of this type.

In accordance with another feature of the invention, the two opposite end sides delimit a length of the honeycomb body and the honeycomb body has a maximum extent perpendicular to the length, with a ratio of extent to length being at least 2. This means, in particular, honeycomb bodies having a maximum extent of their cross section which is considerably greater than the length of the honeycomb body. The maximum extent, for example in the case of substantially cylindrical honeycomb bodies, is at least 100 mm or even 200 mm or up to approximately 400 mm. At the same time, the honeycomb bodies then have, for example, only a maximum length of approximately 50 mm to 70 mm.

In this respect, the ratio of extent to length can also be at least 3.5 or even greater than 5. It is in precisely these embodiments of the honeycomb body that the brazed pattern proposed herein is surprising because the large inner volume of the honeycomb body must at the same time be permanently maintained during the high thermal and dynamic loadings. However, this could be proven, for example, at slightly lower flow speeds of the exhaust gas, in durability tests.

In accordance with a further feature of the invention, the brazing material-free region has an average width of less than 10% of the extent. The average width is therefore preferably at most 10 mm and is preferably in a range of from 5 mm to 10 mm. However, it is usually advantageous, with increasing extent, to also select a larger average width.

In accordance with an added feature of the invention, the brazing material connections are formed partially into the channels proceeding from the end side. In this case, the at least one brazed zone includes at least 60%, preferably 80% of the end side.

In accordance with an additional feature of the invention, the brazing material connections are provided between the at least one layer and the at least one housing only in at least one partial section which is spaced apart from the end sides. This means, for example, that the at least one layer is formed, in the central region between the end sides, with an encircling partial section. The brazing material connections are preferably formed between the ends of the at least one layer and the housing. In this embodiment, it is particularly advantageous if the layers include a plurality of at least partially structured metal foils which are fastened with both ends in each case to the housing through the use of the partial section. It is, however, fundamentally also possible for other materials to be considered for constructing the layers, such as for example wire cloth, nonwovens etc.

In accordance with yet another feature of the invention, it is likewise advantageous if the honeycomb body has only one brazed zone at the end sides in each case and, spaced apart therefrom, a brazed partial section with a brazing material connection between the at least one layer and the at least one housing. With such an embodiment of the honeycomb body, it is possible to create a very large "flexible region" in the inner region, with permanent fixing of the metallic layers to the housing at the same time being ensured with relatively little use of brazing material. More detailed information in this regard can be gathered, in particular, from the description of FIG. 1 as well.

With the objects of the invention in view, there is furthermore provided an exhaust-gas treatment component for an internal combustion engine, the component comprising a honeycomb body according to the invention.

Consideration is given, in particular, to catalytic converters, filters, particle traps, absorbers, parts of a reformer or of a fuel cell, flow mixers, heat exchangers and the like as exhaust-gas treatment components. Due to the advantages described above and below, of the honeycomb body and of the exhaust-gas treatment component, use in a motor vehicle is proposed in particular.

With the objects of the invention in view, there is also provided a motor vehicle, comprising a honeycomb body according to the invention or an exhaust-gas treatment component for an internal combustion engine, including a honeycomb body according to the invention.

With the objects of the invention in view, there is concomitantly provided a method for producing a honeycomb body. The method comprises applying brazing material in at least one partial section of a housing, winding or coiling at least one metallic layer, at least partially inserting the metallic layer into the housing, brazing at least one zone at one end side to produce a belt-shaped brazing material-free region adjacent the housing, and heating the honeycomb body to form brazing material connections in the at least one partial section and in the at least one zone.

During the application of brazing material, a belt-shaped brazing material is preferably applied to the inside of the housing. Alternatively, the brazing material can also be applied to the outer periphery of the previously wound or coiled metallic layer. The plurality of metallic layers (if appropriate with a plurality of stacks) are preferably wound or coiled in such a way that they assume, for example, an S-shaped, V-shaped or similar construction and, when inserted into the housing, they come into contact, through the use of their ends, with the housing in each case. During the brazing of the at least one zone, it is possible to apply an adhesive using a stamp and to subsequently add powdered brazing material, in such a way that the latter remains adhered to the glued zones. It is preferable for only a single zone to be provided on each end side, which zone is loaded with brazing material. The subsequent heating of the honeycomb body advantageously takes place in a high-temperature vacuum oven, with the brazing material connections being formed at the points at which the brazing material is provided. In addition to the brazing material connections, it is possible for other connections, such as for example diffusion connections, to be generated for example in the non-brazed regions. Diffusion connections of this type assist the durability of the honeycomb body even under high thermal and dynamic loadings.

Other features which are considered as characteristic for the invention are set forth in the appended claims, noting that it is possible for the features listed individually in the claims to be combined with one another in any desired technologically expedient manner to demonstrate further embodiments of the invention.

Although the invention is illustrated and described herein as embodied in a honeycomb body with an end-side brazing zone, an exhaust-gas treatment component and a motor vehicle having a honeycomb body and a method for producing a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, to which the invention is, however, not restricted.

DETAILED DESCRIPTION OF THE INVENTION

Figure 1:
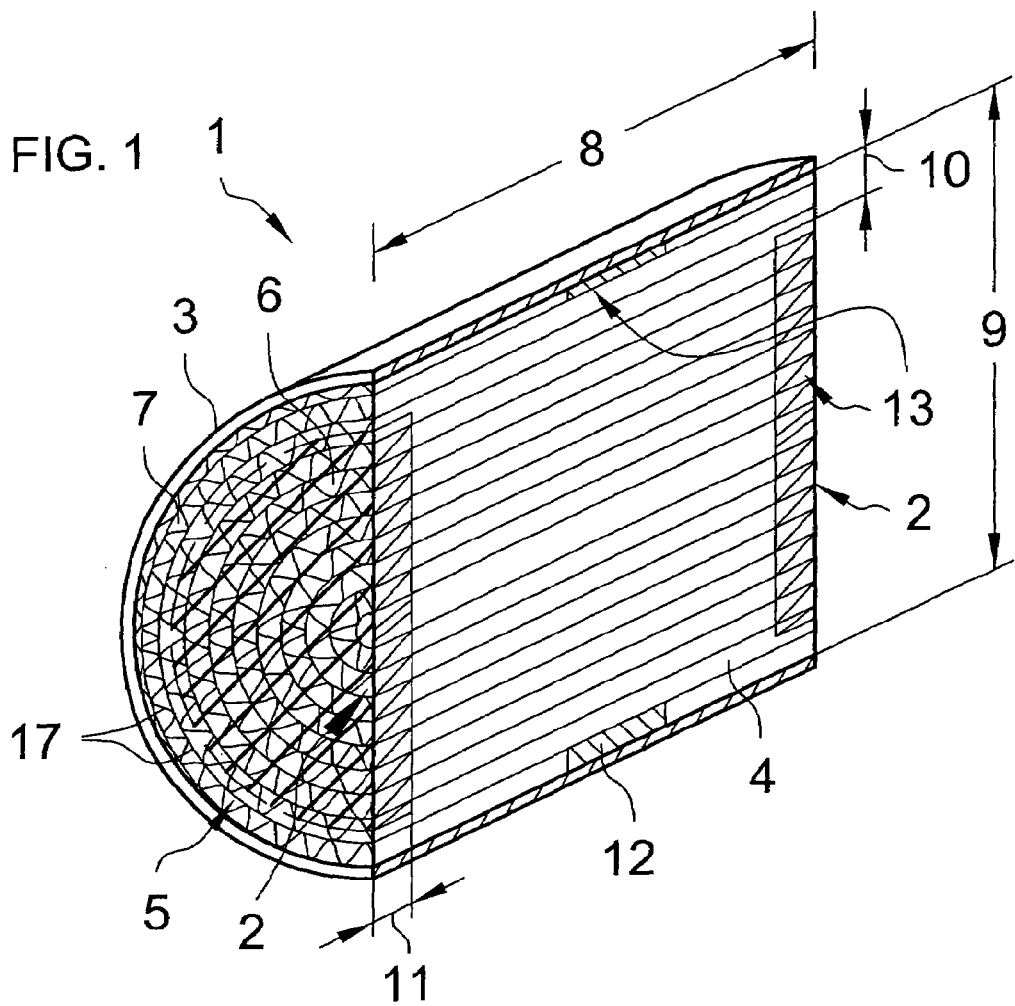
FIG. 1 is a diagrammatic, perspective, sectional view of an embodiment variant of a honeycomb body.

Referring now to the figures of the drawings in detail and first, particularly, to FIG. 1 thereof, there is seen a perspective and sectional illustration of a spirally-wound honeycomb body 1 which includes corrugated and smooth metal foils 17 that form layers 5 with a multiplicity of channels 4. The layers 5 are connected through the use of technical joining, specifically in particular brazing, to a housing 3.

The honeycomb body 1 has a characteristic brazing pattern which is formed by zones 6 situated at end sides or faces 2 and a partial section 12 therebetween which runs along the periphery, and through the use of which desired brazing material connections 13 are generated. What makes the brazing pattern special is that the brazed zones 6 each form one belt-shaped, strip-shaped or band-shaped brazing material-free region 7 which adjoins or is adjacent the housing 3. This means, in other words, that a circular strip is formed in this case in which no brazing material connections are formed. In this regard, no section of the brazed zone 6 directly adjoins the outer edge of the honeycomb body 1 or the housing 3. The brazed zone 6 is formed to a depth 11, proceeding from the end side 2, into the honeycomb body 1. In this case, the depth 11 of the zone 6 is preferably equal in magnitude at both end sides 2. The belt-shaped brazing material-free region 7, too, is formed in an encircling fashion with a uniform width 10 which, in a central region, is preferably less than 10% of an extent 9.

The honeycomb body 1 according to the invention is, in particular, one in which a length 8 is considerably smaller than the maximum extent 9. The ratio of extent to length is thus for example at least 2, preferably at least 3.5. The length 8 is defined substantially by the two end sides. The maximum extent 9 is preferably likewise related to one end side 2, wherein in the case of unequal end sides 2 and/or polygonal shapes of the end sides 2, the greatest possible extent 9 is meant in each case.

Figure 2:
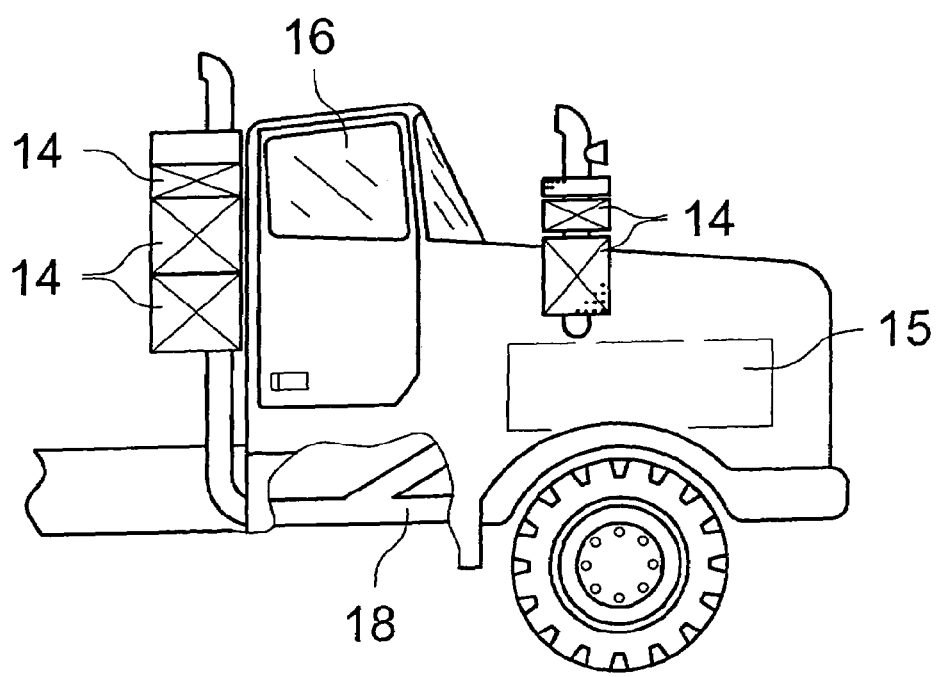
FIG. 2 is a fragmentary, side-elevational view illustrating a preferred application of a honeycomb body of this type as an exhaust-gas treatment component of a motor vehicle.

FIG. 2 shows a preferred field of use of such large honeycomb bodies 1 as exhaust-gas treatment components 14 for an internal combustion engine 15 in a motor vehicle 16, in particular in a truck or a bus. The exhaust gas which is generated in the internal combustion engine 15 is supplied through a corresponding exhaust system 18 to a plurality of exhaust-gas treatment components 14 such as, for example, catalytic converters, filters or the like. As a result of the contact with the exhaust-gas treatment components 14, the exhaust gas is cleaned and treated in such a way that it can finally be discharged to the atmosphere.

The invention claimed is:

1. A honeycomb body, comprising:
   two oppositely-disposed end sides;
   at least one housing;
   at least one metallic layer forming channels; and
   at least one brazed zone disposed at least at one of said end sides and spaced from said housing to define a belt-shaped brazing material-free region adjoining said housing.

2. The honeycomb body according to claim 1, which further comprises a length of the honeycomb body delimited by said two oppositely-disposed end sides, a maximum extent of the honeycomb body perpendicular to said length, and a ratio of said extent to said length of at least 2.

3. The honeycomb body according to claim 2, wherein said brazing material-free region has an average width of less than 10% of said extent.

4. The honeycomb body according to claim 1, wherein said at least one brazed zone has a depth of at most 10 millimeters.

5. The honeycomb body according to claim 1, which further comprises at least one partial section spaced apart from said end sides, and brazing material connections disposed between said at least one layer and said at least one housing only in said at least one partial section.

6. The honeycomb body according to claim 1, wherein said at least one brazed zone includes only two brazed zones each disposed at a respective one of said end sides, and a brazed partial section is spaced apart from said brazed zones and has brazing material connections between said at least one layer and said at least one housing.

7. An exhaust-gas treatment component for an internal combustion engine, the component comprising a honeycomb body according to claim 1.

8. A motor vehicle, comprising a honeycomb body according to claim 1.

9. A motor vehicle, comprising an exhaust-gas treatment component for an internal combustion engine, said component including a honeycomb body according to claim 1.

10. A method for producing a honeycomb body, the method comprising the following steps:
    applying brazing material in at least one partial section of a housing;
    winding or coiling at least one metallic layer;
    at least partially inserting the metallic layer into the housing;
    brazing at least one zone disposed at one end side and spaced from the housing to define a belt-shaped brazing material-free region adjacent the housing; and
    heating the honeycomb body to form brazing material connections in the at least one partial section and in the at least one zone.

* * * * *